(12) United States Patent
White et al.

(10) Patent No.: US 8,567,809 B2
(45) Date of Patent: Oct. 29, 2013

(54) COLLAPSIBLE SHOPPING CART

(75) Inventors: Allison White, Severna Park, MD (US);
David White, Severna Park, MD (US);
Matthew A. Sommerfield, Allentown, PA (US)

(73) Assignee: Cargo Cart Co., Saverna Park, MD (US)

( * ) Notice: Subject to any disclaimer, the term of this patent is extended or adjusted under 35 U.S.C. 154(b) by 0 days.

(21) Appl. No.: 13/446,482

(22) Filed: Apr. 13, 2012

(65) Prior Publication Data

US 2012/0261907 A1 Oct. 18, 2012

Related U.S. Application Data

(60) Provisional application No. 61/517,007, filed on Apr. 13, 2011.

(51) Int. Cl.
*B62B 3/02* (2006.01)
*B62B 3/04* (2006.01)

(52) U.S. Cl.
USPC ............. 280/651; 280/638; 280/35; 280/639; 280/646; 280/655; 280/47.33

(58) Field of Classification Search
USPC ......... 280/638, 35, 639, 38, 39, 641, 646, 42, 280/651, 655, 47.35
See application file for complete search history.

(56) References Cited

U.S. PATENT DOCUMENTS

| | | | |
|---|---|---|---|
| 2,133,834 A | 10/1938 | Sheldon | |
| 2,141,881 A | 12/1938 | Schray | |
| 2,212,053 A | 8/1940 | Smith | |
| 3,326,571 A * | 6/1967 | Levine | 280/641 |
| 4,047,724 A | 9/1977 | Shaffer | |
| 5,507,507 A | 4/1996 | Davidson | |
| 5,660,476 A | 8/1997 | DeCoster | |
| 5,694,663 A * | 12/1997 | Tserng | 16/113.1 |
| 6,394,471 B1 | 5/2002 | Watson | |
| 6,619,546 B1 | 9/2003 | Nguyen et al. | |
| 6,695,324 B1 * | 2/2004 | Wu | 280/47.315 |
| 6,766,931 B2 | 7/2004 | Wolf | |
| 7,168,715 B1 | 1/2007 | Friedman | |
| 7,188,847 B1 | 3/2007 | Friedman | |
| 7,392,992 B2 | 7/2008 | Stone et al. | |
| 7,566,069 B1 | 7/2009 | Ortega et al. | |
| 7,703,776 B1 | 4/2010 | Nugent | |
| D634,913 S | 3/2011 | Xie | |
| 2002/0149176 A1 | 10/2002 | Miller | |
| 2007/0096437 A1 * | 5/2007 | Watson | 280/651 |
| 2008/0191451 A1 * | 8/2008 | Driessen | 280/650 |
| 2008/0303248 A1 | 12/2008 | Chaparro | |
| 2010/0052275 A1 | 3/2010 | Reimers et al. | |

* cited by examiner

*Primary Examiner* — J. Allen Shriver, II
*Assistant Examiner* — Bryan Evans
(74) *Attorney, Agent, or Firm* — Welsh Flaxman & Gitler LLC

(57) ABSTRACT

A collapsible shopping cart includes a collapsible support assembly having a support frame with a vertical frame member and a horizontal frame member. The vertical support member is pivotally secured to the horizontal support member allowing the support frame to be selectively folded. A plurality of wheels are coupled to the horizontal support member. The plurality of wheels are coupled to the horizontal support member for movement between a use orientation and a storage orientation, wherein when the plurality of wheels are in the use orientation they extend from the horizontal support manner in a manner permitting engagement with a horizontal support surface such that the support assembly may roll thereupon. First and second storage receptacles shaped and dimensioned for selective attachment to the support assembly are provided.

14 Claims, 14 Drawing Sheets

COLLAPSIBLE SHOPPING CART

CROSS REFERENCE TO RELATED APPLICATION

This application claims the benefit of U.S. Patent Application Ser. No. 61/517,007, entitled "'Car-go green' the collapsible shopping cart for sustainable living", filed Apr. 13, 2011.

BACKGROUND OF THE INVENTION

1. Field of the Invention

The invention relates to a collapsible shopping cart.

2. Description of the Related Art

A trip to the grocery store can be quite eventful, involving may steps and potential pitfalls. One example of the current grocery shopping experience may look like this.

The shopper first retrieves a store-provided shopping cart from the parking lot and, if inclined, cleans handle of the store's shopping cart. Not knowing the cleaning routines used to sanitize the cart or the hand-washing habits of previous cart users can lead to a week long bout with the flu, cold or other infection.

Once inside the store, the shopper chooses item(s) and bags item(s) (if in produce or meat section), placing the various selected items in the store's shopping cart. The shopper then removes the item(s) from cart at checkout line and places item(s) on the conveyor belt to be scanned. The scanned item(s) are then bagged by a store employee or by the shopper. The bagged item(s) are then returned to store's cart and the shopper pays the cashier.

The shopper then wheels the cart out of the store and to his/her automobile, where he/she removes the bagged item(s) from the store's shopping cart and places them in the automobile. The shopper then drives home and removes the item (s) from automobile and carries them into the house, condo, office or apartment building (often requiring multiple trips). The shopper then un-bags item(s), places the item(s) in storage, places the plastic bag(s) in the recycle bin or trashcan, or returns plastic and/or paper bag(s) to store's used-bag collection site.

This is a complicated time consuming process require multiple unnecessary steps. The above description illustrates potential pitfalls commonly experienced when depending on a store provided cart. One can imagine other potential pitfalls that arise when shopping at open markets, farmer's markets etc. where no cart or basket is provided to the shopper.

For those living in urban environments similar elaborate processes are encountered during the shopping processing. Still further, those living in urban environments often walk to the store and require their own cart for carrying goods between the store and their home. They also often have limited space to store such carts when they are not in use. There are also environments where shopping carts are not readily available, for example, farmer markets, and an easily transported cart would be highly desirable.

SUMMARY OF THE INVENTION

It is, therefore, an object of the present invention to provide a collapsible shopping cart including a collapsible support assembly having a support frame with a vertical frame member and a horizontal frame member. The vertical support member is pivotally secured to the horizontal support member allowing the support frame to be selectively folded. The vertical frame member is an elongated member having a first end and a second end. The horizontal frame member is an elongated member having a first end and a second end, as well as an upper surface and a lower surface. The first end of the vertical frame member is pivotally connected to the first end of the vertical frame member. A plurality of wheels are coupled to the horizontal support member. The plurality of wheels are coupled to the horizontal support member for movement between a use orientation and a storage orientation, wherein when the plurality of wheels are in the use orientation they extend from the horizontal support manner in a manner permitting engagement with a horizontal support surface such that the support assembly may roll thereupon. First and second storage receptacles shaped and dimensioned for selective attachment to the support assembly are provided.

It is also an object of the present invention to provide a shopping cart wherein the first end of the vertical frame member is provided with a projection shaped and dimensioned to fit within a recess formed in the first end of the horizontal frame member, and a pivot pin couples the projection within the recess such that the vertical frame member and the horizontal frame member may pivot relative to each other.

It is another object of the present invention to provide a shopping cart including a tilt lock pin secured between the vertical frame member and the horizontal frame member.

It is a further object of the present invention to provide a shopping cart wherein the plurality of wheels comprises a first and second front wheels and first and second rear wheels.

It is also an object of the present invention to provide a shopping cart wherein the first and second front wheels are pivotally coupled to the second end of the horizontal frame member on opposite sides thereof.

It is another object of the present invention to provide a shopping cart wherein the first and second rear wheels are respectively supported by first and second rear support arms which extend from opposite sides of the horizontal frame member at the first end of the horizontal frame member.

It is a further object of the present invention to provide a shopping cart wherein the first and second rear wheels are supported in a position beyond both the lateral and longitudinal extent of the horizontal frame member when in the use orientation.

It is also an object of the present invention to provide a shopping cart wherein each of the first end second rear support arms includes a first end pivotally secured to the horizontal frame member and a second end to which the respective first and second rear wheels are secured.

It is another object of the present invention to provide a shopping cart including a control lever connected to both the first and second rear support arms by a linkage assembly.

It is a further object of the present invention to provide a shopping cart wherein the second end of the vertical frame member is provided with a handle pivotally secured to the vertical frame member at the second end of the vertical frame member.

It is also an object of the present invention to provide a shopping cart wherein the vertical frame member is composed of telescoping upper and lower vertical frame components.

It is another object of the present invention to provide a shopping cart wherein movement of the upper vertical frame component and the lower vertical frame component is controlled by a spring biased, moveable locking pin extending between the upper vertical frame component and the lower vertical frame component.

It is a further object of the present invention to provide a shopping cart wherein the vertical frame member is provided with a latch assembly for supporting the first or second receptacles.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
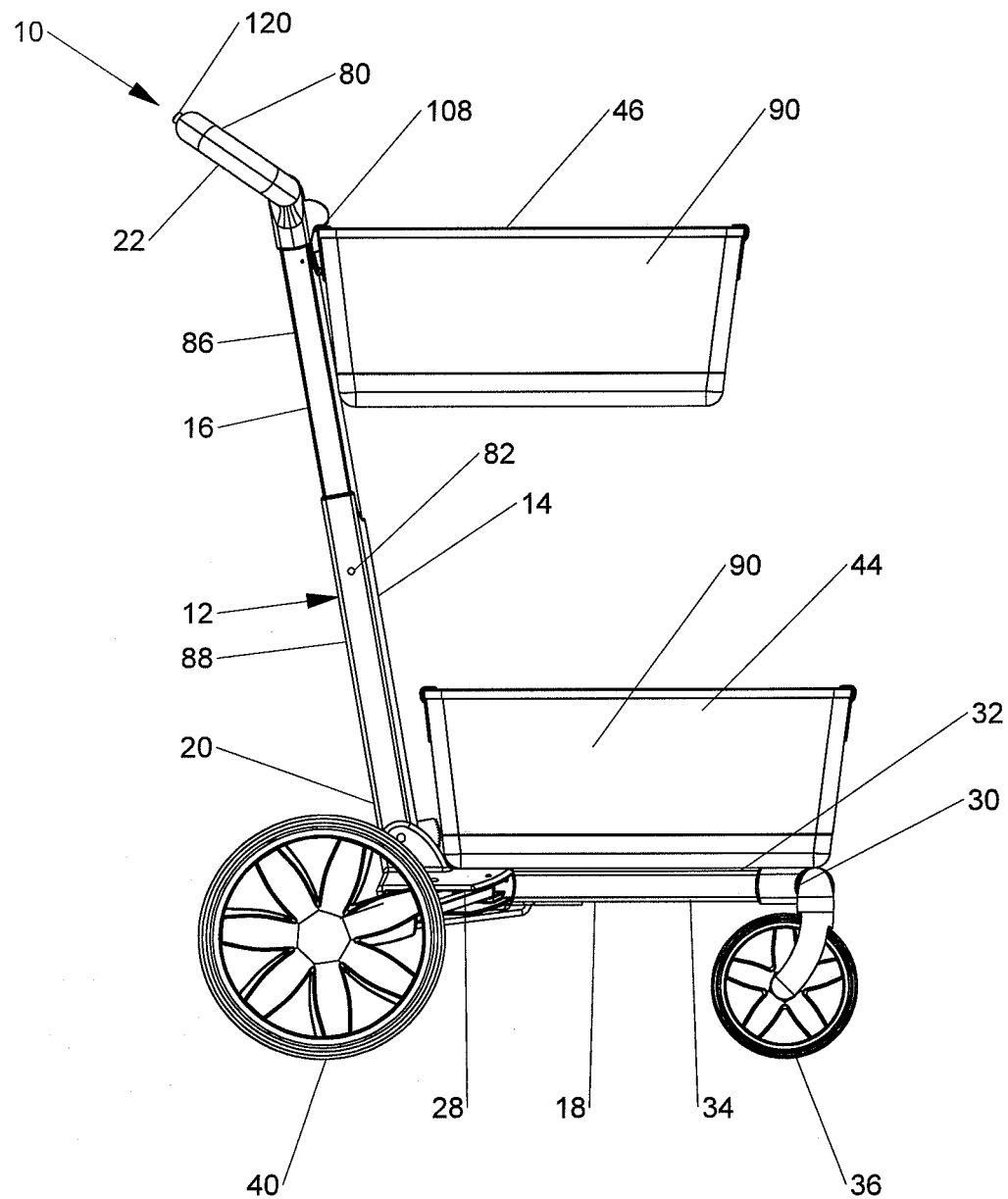
FIG. 1 is a side plan view of the present collapsible shopping cart.
Figure 2:
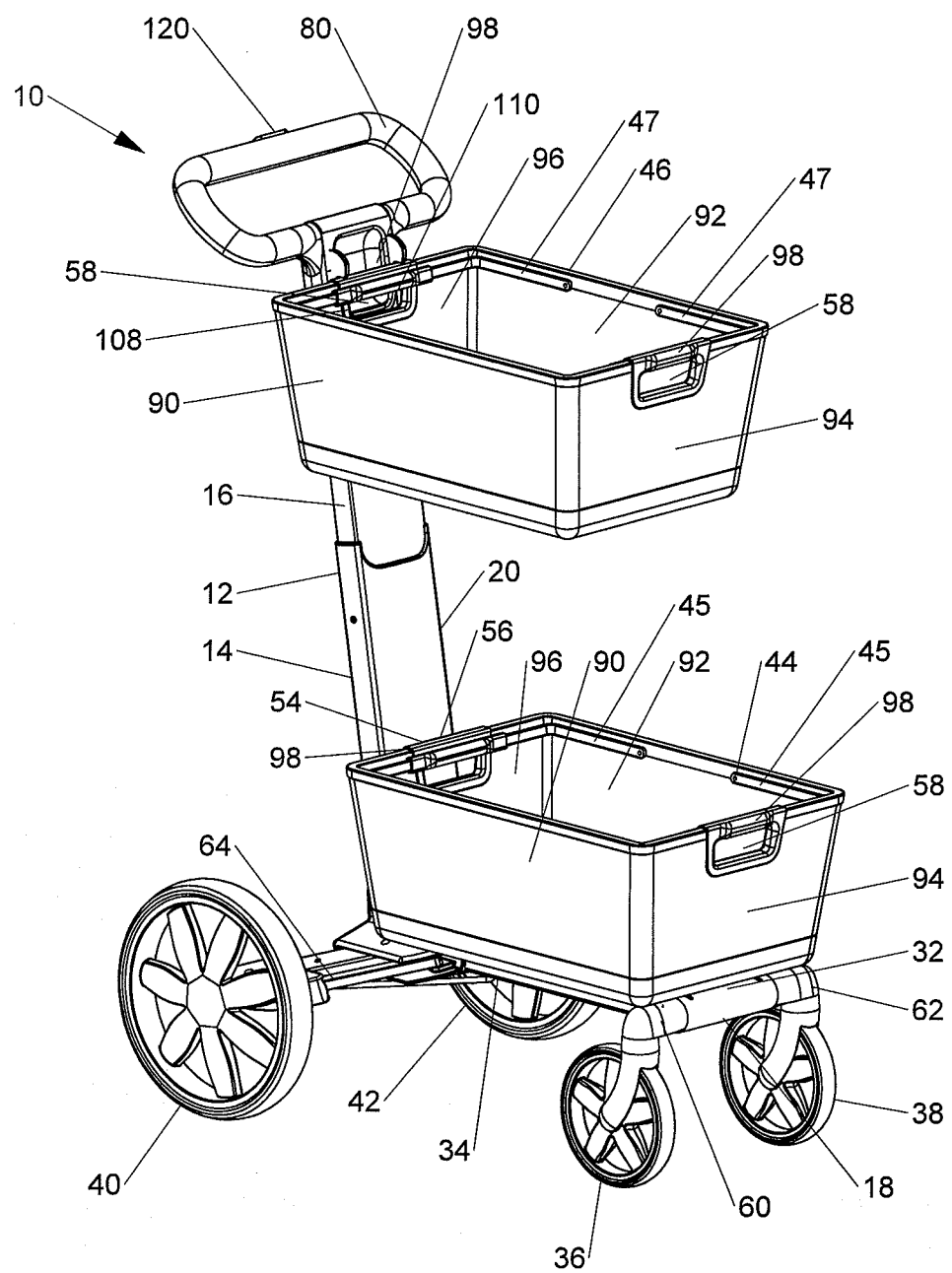
FIG. 2 is a perspective view of the present collapsible shopping cart.
Figure 3:
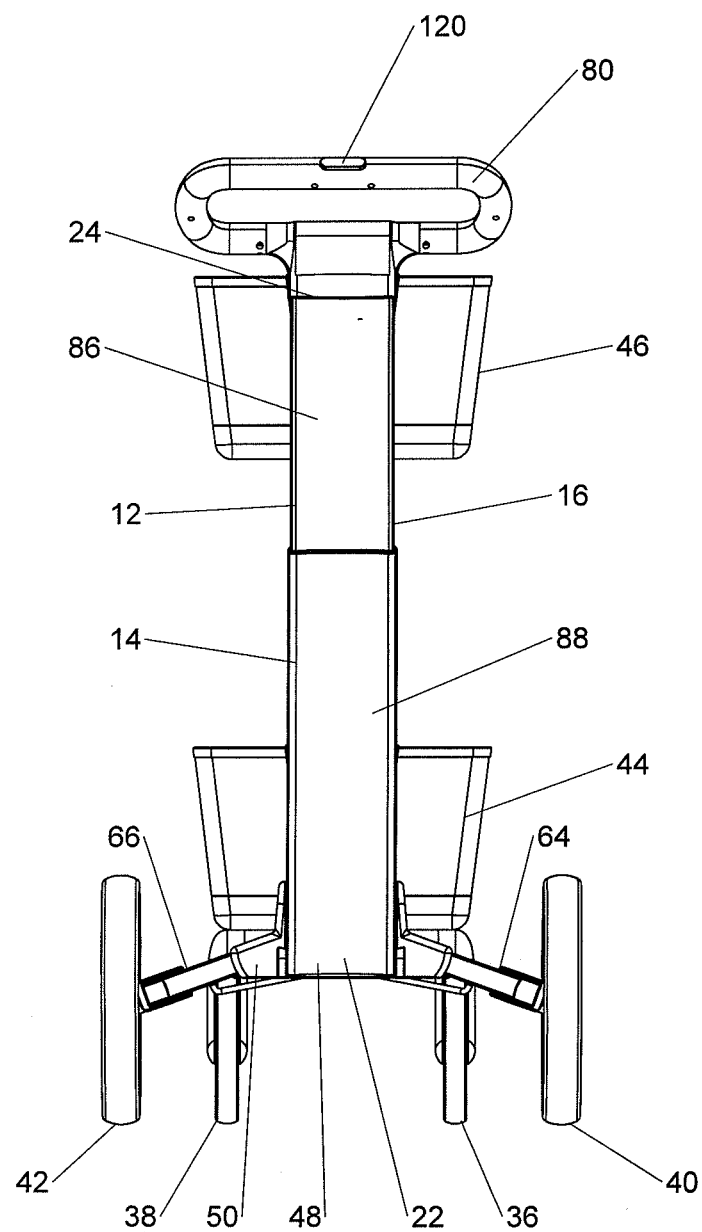
FIG. 3 is a rear plan view of the present collapsible shopping cart.
Figure 4:
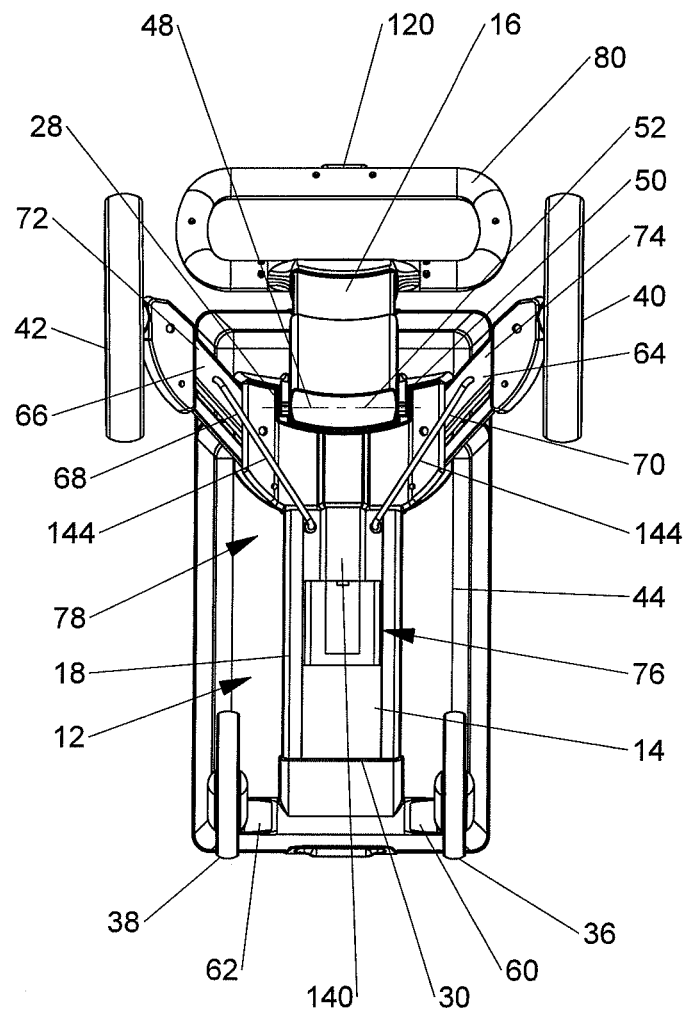
FIG. 4 is a bottom view of the present collapsible shopping cart.
Figure 5:
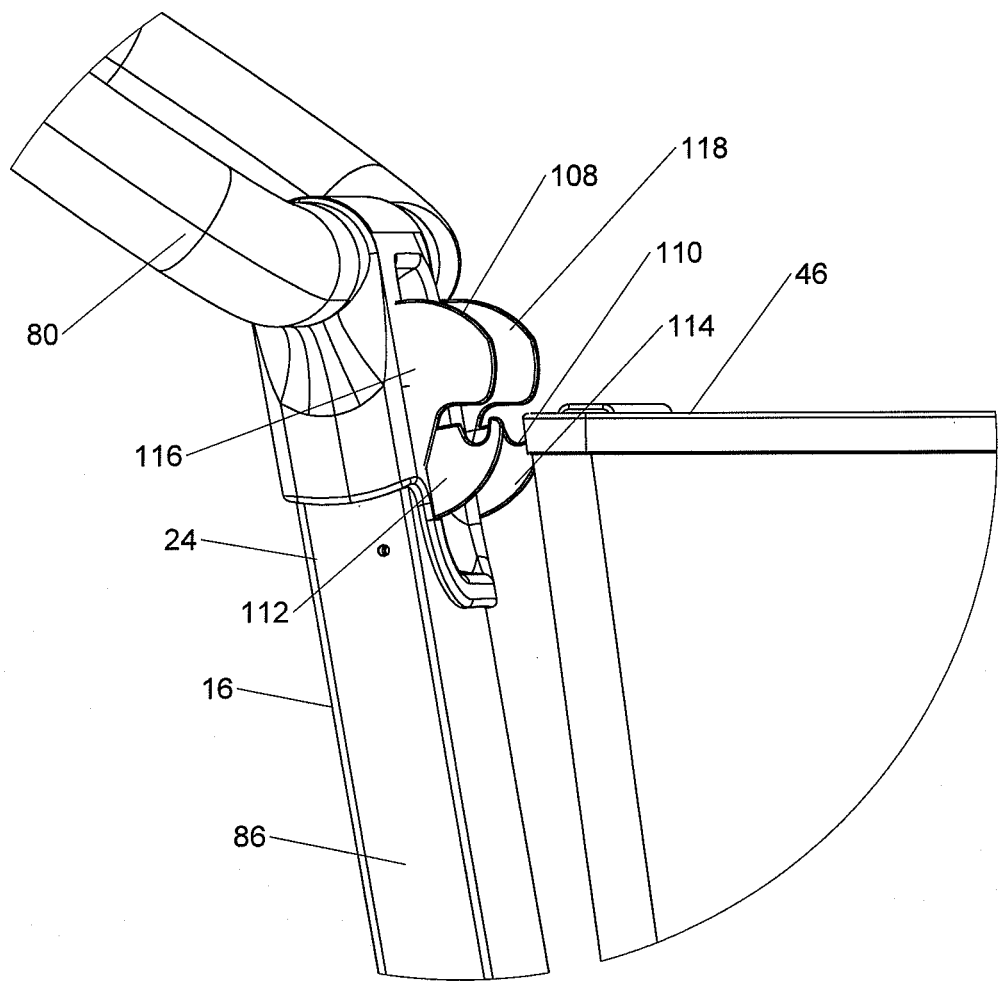
FIGS. 5 and 6 are detailed side views showing attachment of a storage receptacle to the support frame.
Figure 6:
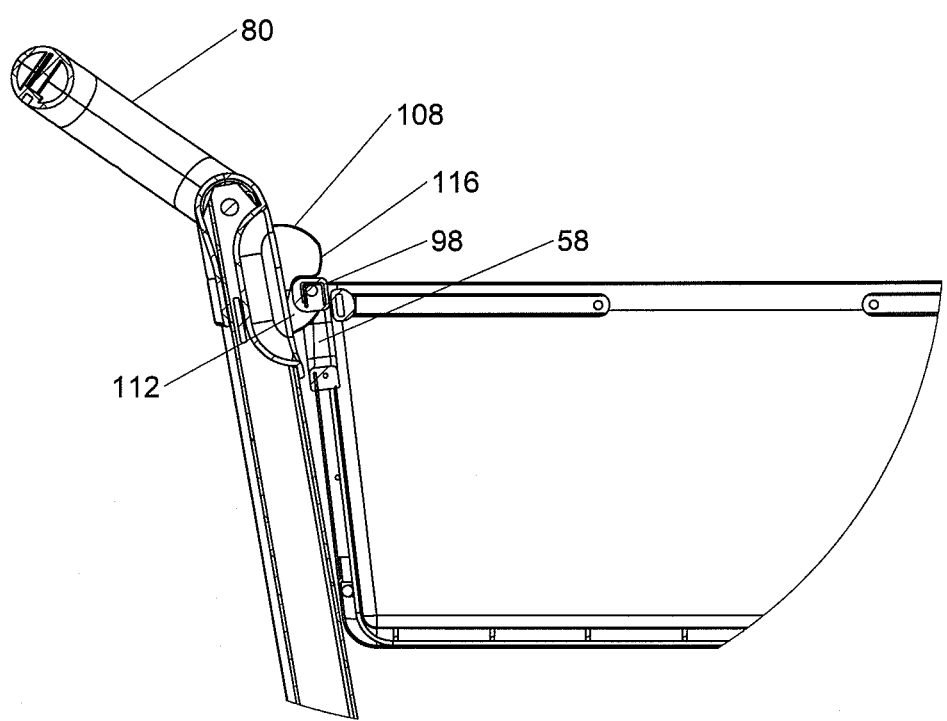
Figure 7:
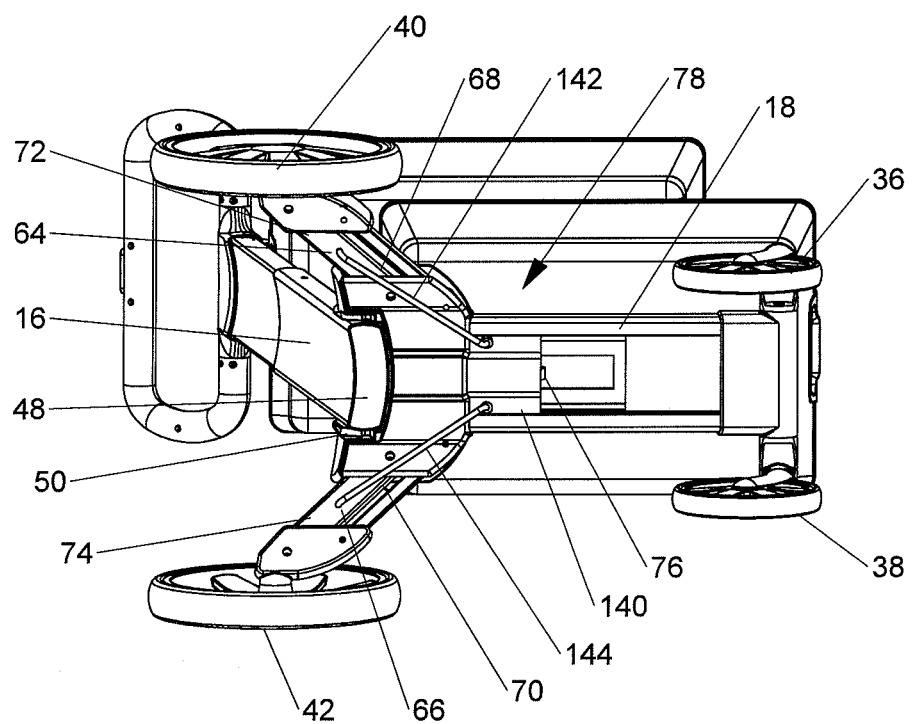
FIG. 7 is a detailed bottom view of the present collapsible shopping cart.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to the various figures, a collapsible shopping cart 10 is disclosed. Briefly, and as will be discussed below in greater detail, the collapsible shopping cart 10 includes a collapsible support assembly 12 having a support frame 14. The support frame 14 is composed of a vertical (or first) frame member 16 and a horizontal (or second) frame member 18, the vertical frame member 16 being pivotally secured to the horizontal frame member 18 allowing the support frame 14 to be selectively folded between a user orientation and a storage orientation. The vertical frame member 16 is an elongated member 20 having a first end 22 and a second end 24. The horizontal frame member 18 is an elongated member 26 having a first end 28 and a second end 30, as well as an upper surface 32 and a lower surface 34. The first end 22 of the vertical frame member 16 is pivotally connected to the first end 28 of the horizontal frame member 18.

A plurality of wheels 36, 38, 40, 42 are coupled to the horizontal frame member 18 for movement between a use orientation and a storage orientation, wherein when the plurality of wheels 36, 38, 40, 42 are in the use orientation they extend from the horizontal frame member 18 in a manner permitting engagement with a horizontal support surface such that the support assembly 12 may roll thereupon. It is appreciated brakes are planned as a feature of the shopping cart. The brakes will be conventional in nature and similar to those currently used with strollers, golf carts, etc. A preferred brake most likely would be a foot petal that is pushed to lock and pushed again to release. The shopping cart 10 also includes a first storage receptacle 44 shaped and dimensioned for selective attachment to the upper surface 32 of the horizontal frame member 18 and a second storage receptacle 46 shaped and dimensioned for selective attachment to the vertical frame member 16. In accordance with a preferred embodiment, the straight and telescoping sections, that is, the frame member of the shopping cart are intended to be extruded aluminum. The various connecting pieces, end fittings, wheels, etc. are preferably molded plastic, more preferably glass reinforced Nylon, and coupling members, for examples screws, etc., may be steel.

It will be appreciated terms such as "vertical" and "horizontal" are relative terms used to describe the present invention. These terms refer to the shopping cart when in a preferred use orientation as shown in the various drawings.

The present shopping cart 10 provides a sturdy and appealing collapsible shopping cart 10 for collecting, holding, and transporting items purchased at a retail outlet to a automobile and then into a house, apartment, condo/office, etc. The present shopping cart 10 also provides a mechanism to transport items via foot in walkable communities. The shopping cart 10 is preferably constructed of light-weight aluminum and/or other metals and plastics. It has four support arms, each with a 6½ inch (front wheels) to 11 inch wheel (rear wheels) that allows for use on rough/uneven surfaces and stairs.

The present shopping cart 10 offers various advantages. For example, it allows shoppers to use their own shopping cart 10 and cart containers (or storage receptacles as referred to herein) to hold groceries and other items. The present shopping cart 10 also allows shoppers to pack their own items as they shop thereby preventing/reducing grocery item bruising, breaking, smashing, squishing and cross-contamination. The present shopping cart 10 also reduces the use of plastic and paper bags. And using currently available technology, shoppers can scan their groceries as they shop and pack them directly into the storage receptacles thereby reducing or eliminating the use of paper and plastic in the produce section, meat section, and at the checkout line. The present shopping cart 10 also provides for increased sanitation by reducing handling by store employees and contact with store-owned carts and store checkout conveyor belts. The present shopping cart 10 also significantly reduces shopper fatigue by decreasing the number of times a shopper handles an item and/or a bag of items.

As discussed above, the support frame 14 is collapsible between a use orientation and storage orientation. Movement between these orientations is generally achieved by pivotally connecting the vertical frame member 16 to the horizontal frame member 18. The first end 22 of the vertical frame member 16 is provided with a projection 48 shaped and dimensioned to fit within a recess 50 formed in the first end 28 of the horizontal frame member 18. A pivot pin 52 couples the projection 48 within the recess 50 such that the vertical frame member 16 and the horizontal frame member 18 may pivot relative to each other.

The pivot pin 52 includes longitudinal axis that is oriented substantially perpendicular to the longitudinal axes of both the vertical frame member 16 and the horizontal frame member 18. In this way, the vertical frame member 16 is folded upon the horizontal frame member 18 when the support frame 14 is moved between its use orientation and its storage orientation. In particular, the vertical frame member 16 and the horizontal frame member 18 move between a relative position where the longitudinal axis of the vertical frame member 16 and the longitudinal axis of the horizontal frame member 18 are in a slightly obtuse angular orientation when the shopping cart 10 is in its use orientation and a relative position where the longitudinal axis of the vertical frame member 16 and the longitudinal axis of the horizontal frame member 18 are in a substantially parallel orientation when the shopping cart 10 is in its storage orientation. The support frame 14 is secured, but selectively, held in the respective use orientation and storage orientation by various latching structures, for example, the lock pin 82 of the vertical frame member 16 and the tilt lock pin 84 secured between the vertical frame member 16 and the horizontal frame member 18 discussed below in greater detail.

Extending from the horizontal frame member 18 are a plurality of wheels 36, 38, 40, 42. In accordance with a preferred embodiment, the horizontal frame member 18 is a provided with first and second front wheels 36, 38 and first and second rear wheels 40, 42. The first and second front wheels 36, 38 are pivotally coupled to the second end 30 of the horizontal frame member 18 on opposite sides thereof. The first and second rear wheels 40, 42 are pivotally coupled to the first end 28 of the horizontal frame member 18 on opposite sides thereof.

The first and second front wheels 36, 38 are respectively supported by first and second front support arms 60, 62 which extend laterally from opposite sides of the horizontal frame member 18 at the second end 30 of the horizontal frame member 18. The first and second front wheels 36, 38 are pivotally secured to the first and second front support arms 60, 62 in a manner allowing the first and second front wheels 36, 38 to swivel relative thereto. More particularly, each of the first end second front support arms 60, 62 includes a longitudinal axis that extends perpendicular to the longitudinal axis of the horizontal frame member 18 and thereby supports the first and second front wheels 36, 38 positioned beyond the lateral extent of the horizontal frame member 18. This orientation adds to the stability of the overall shopping cart 10 when in its use orientation.

Similarly, the first and second rear wheels 40, 42 are respectively supported by first and second rear support arms 64, 66 which extend obliquely from opposite sides of the horizontal frame member 18 at the first end 28 of the horizontal frame member 18 such that the first and second rear wheels 40, 42 are supported in a position beyond both the lateral and longitudinal extent of the horizontal frame member 18. More particularly, each of the first end second rear support arms 64, 66 includes a first end 68, 70 pivotally secured to the horizontal frame member 18 and second end 72, 74 to which the respective first and second rear wheels 40, 42 are secured. The first ends 68, 70 of the respective first and second rear support arms 64, 66 are pivotally secured to the first end 28 of the horizontal frame member 18 so as to pivot about an axis that is substantially perpendicular to the longitudinal axis of the horizontal frame member 18 and substantially perpendicular to the axes of the first and second front support arms 64, 66.

Given the axis about which the first and second rear support arms 64, 66 rotate, the first and second rear support arms 64, 66, as well as the first and second rear wheels 40, 42, designed to rotate between a use orientation in which the first and second rear wheels 40, 42 are supported in a position beyond both the lateral and longitudinal extent of the horizontal frame member 18 and a storage positioned in which the first and second rear wheels 40, 42 are held adjacent the horizontal frame member 18. Movement is achieved by the provision of a control lever 76 connected to both the first and second rear support arms 64, 66 by a linkage assembly 78.

Figure 8A:
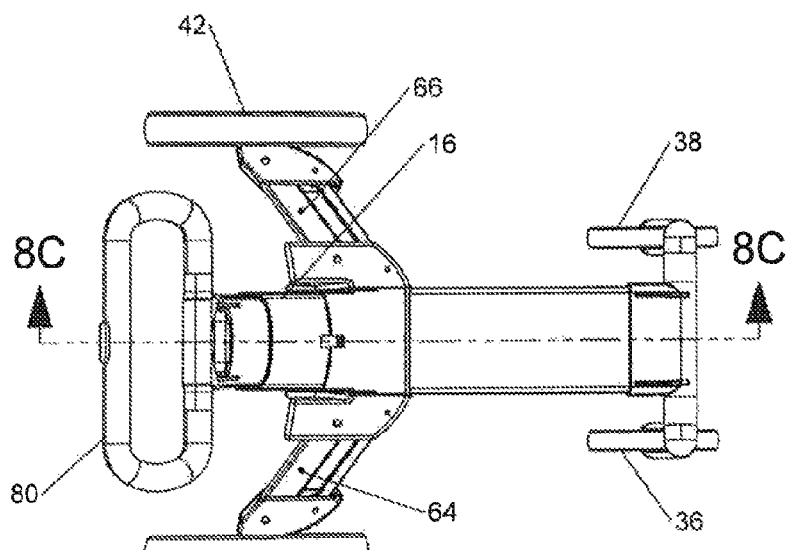
FIGS. 8A, 8B and 8C are respectively a top view, a cross sectional view and a detailed cross sectional view showing the linkage assembly employed in movement of the first and second rear wheels.
Figure 8B:
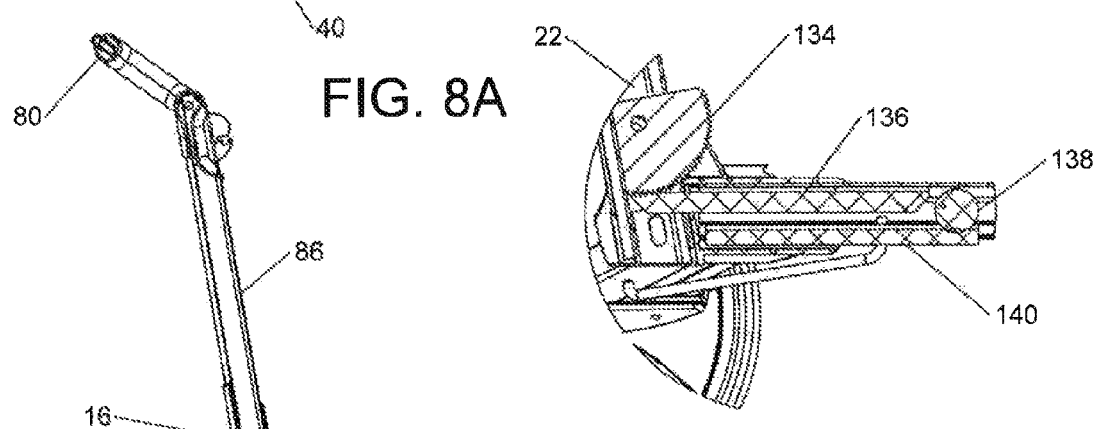
Figure 8C:
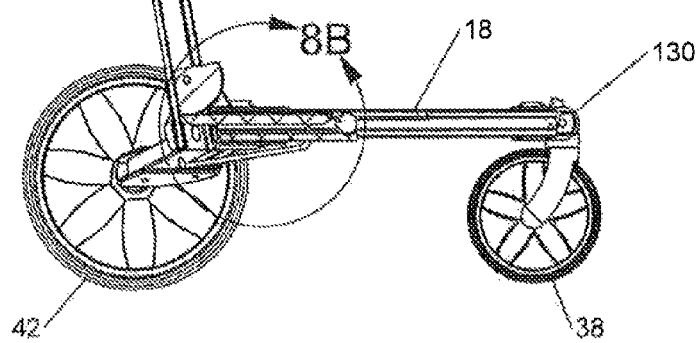
Figure 9:
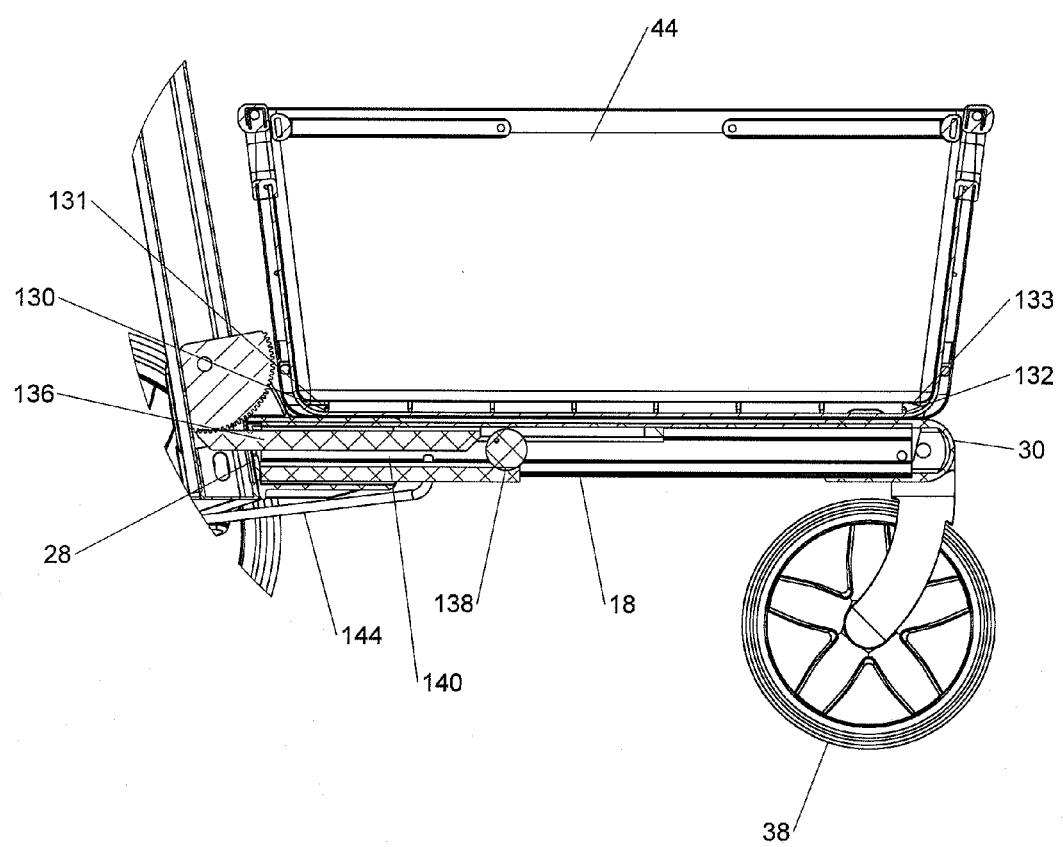
FIG. 9 is a detailed side cross sectional view showing the mechanism for attachment of the first storage receptacle to the horizontal frame member.
Figure 11A:
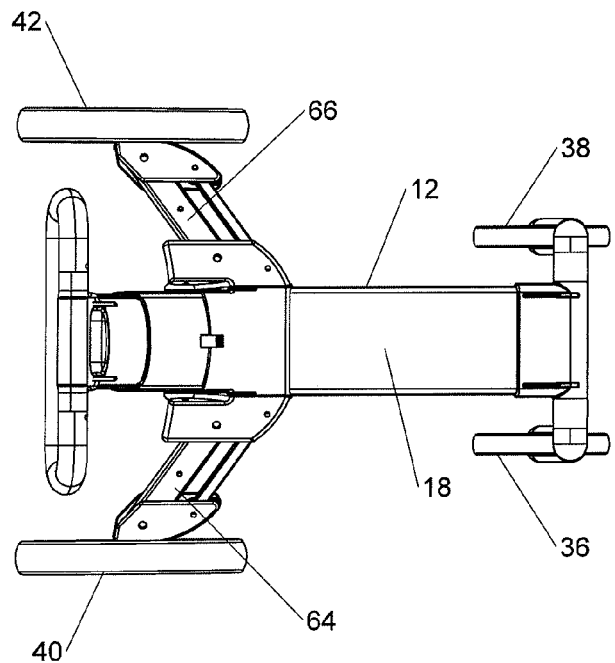
Figure 11B:
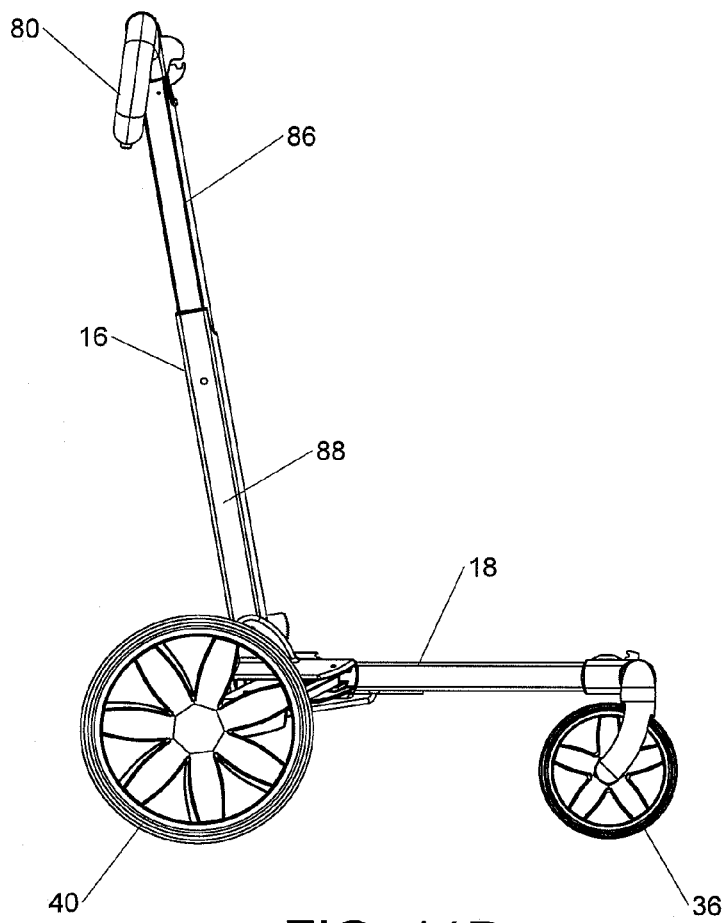
Figure 13A:
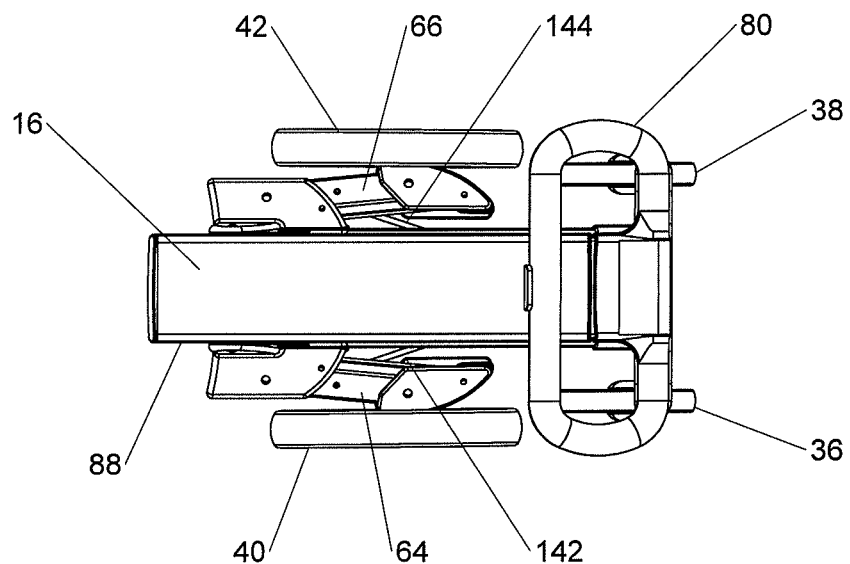

As such, and as will be discussed below in greater detail, upon movement of upper vertical frame component 86 to its storage position within the lower vertical frame component 88 the tilt lock pin 84 is moved to its release position permitting pivoting of the vertical frame member 16 relative to the horizontal frame member 18 as shown with reference to FIGS. 11A&B and 12A,B&C. During movement to the storage orientation, after the upper vertical frame component 86 is moved downward within the lower frame component 88 and the tilt lock pin 84 is moved to its release position, the vertical frame member 16 is rotated relative to the horizontal frame member 18, in particular, toward the horizontal frame member 18. As the vertical frame member 16 is rotated toward the horizontal frame member 18, a gear member 134 secured to the vertical frame member 16 adjacent the first end 22 thereof is rotated. It should first be appreciated that although teeth are not shown in the various gear parts discussed below, they each include appropriate teeth for the purposes described herein. The gear member 134 is coupled to a first sliding plate 136 mounted within the horizontal frame member 18 and rotation of the gear member 134, in a clockwise direction as shown with reference to FIGS. 8A and 8B causes movement of a first sliding plate 136 in a direction away from the second end 30 of the horizontal frame member 18. The first sliding plate 136 is in turn coupled to a transfer gear 138 that transfers movement of the first sliding plate 136 to a second sliding plate 140 mounted within the horizontal frame member 18. The transfer gear 138 is configured such that movement of the first sliding plate 136 away from the second end 30 of the horizontal frame member 18 causes the second sliding plate 140 to move toward the second end 30 of the horizontal frame member 18. The second sliding plate 140 is coupled to first and second linkage arms 142, 144 respectively extending between the second sliding plate 140 and the first and second rear support arms 64, 66. Movement of the second sliding plate 140, and consequently the first and second linkage arms 64, 66, toward the second end 30 of the horizontal frame member 18 causes the first and second support arms 64, 66 to pivot in the same direction thereby drawing the first and second rear wheels 40, 42 inwardly as shown in FIGS. 13A&B and 14A&B. When the user desires to open the support assembly 12 to its use orientation, the process described above is reversed with the vertical frame member 16 being pivoted away from the horizontal frame member 18.

As discussed above, the vertical frame member 16 is also an elongated member having a first end 22 and a second end 24. The second end 24 of the vertical frame member 16 is provided with a handle 80 such that the shopping cart 10 may be easily maneuvered on a support surface when in its use orientation. As will be explained below in greater detail the handle 80 is pivotally secured to the vertical frame member 16 at the second end 24 thereof such that it can be selectively moved between a rearwardly facing, extended use position (as shown in FIGS. 1 to 6) and a collapsed position folded directly next to the second end 24 of the vertical frame member 16 (as shown in FIGS. 9B, 10B, 11B and 12B).

Figure 12B:
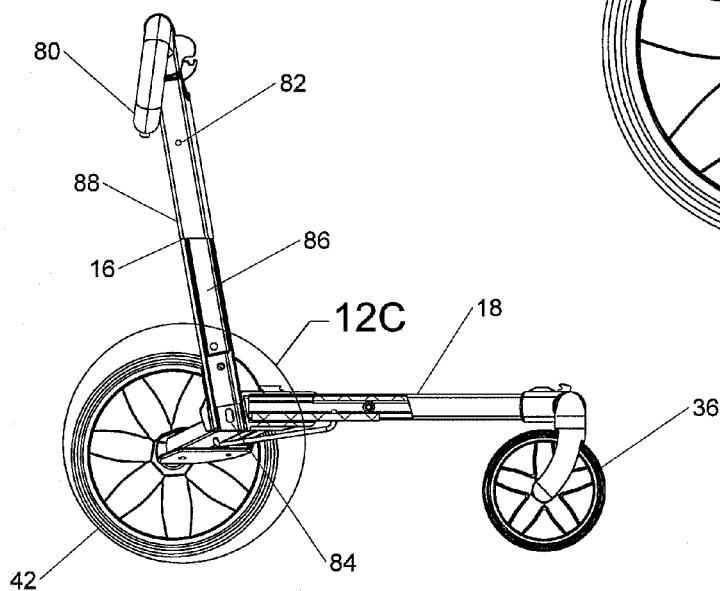
Figure 13B:
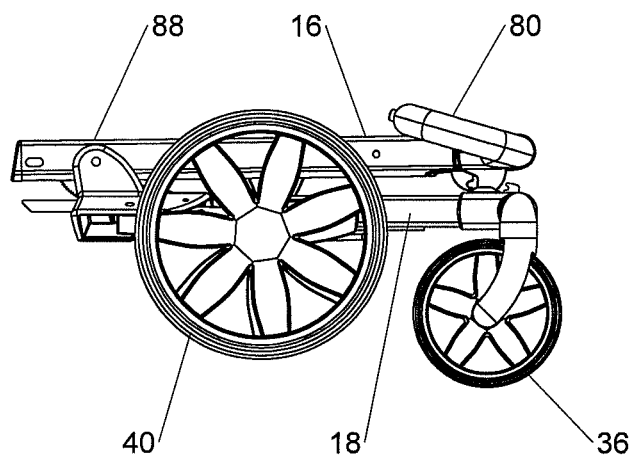

As will be appreciated based upon the following disclosure, the vertical frame member 16 is composed of telescoping upper and lower vertical frame components 86, 88. In accordance with a preferred embodiment, the upper vertical frame component 86 fits within the lower vertical frame component 88 such that the upper vertical frame component 86 may be selectively moved between its extended use position as shown in FIGS. 1 to 6, 10B and 11B and its collapsed storage position as shown in FIGS. 12B, 13B and 14B. Movement is controlled by a spring biased, moveable lock pin 82 extending between the upper vertical frame component 86 and the lower vertical frame component 88.

The shopping cart 10 is provided with a plurality of storage receptacles 44, 46 shaped and dimensioned for selective attachment to the support frame 14. The storage receptacles are identical and similar references numerals will therefore be used for the similar parts of the storage receptacle. The storage receptacles include a slight taper so they may be stacked in a nested arrangement. In accordance with a preferred embodiment, each of the storage receptacles 44, 46 is substantially rectangular with first and second long sides 90, 92 and first and second short sides 94, 96. Each of the short sides 94, 96 includes a receptacle handle 98 that is defined by a recess 58 formed in the wall of the short side 94, 96. In addition, each storage receptable 44, 46 includes a set of handles 45, 47 that may be folded out for use.

In accordance with a preferred embodiment, a first storage receptacle 44 shaped and dimensioned for selective attachment adjacent to the upper surface 32 of the horizontal frame member 18. In particular, and with reference to FIG. 9, the upper surface 32 of the horizontal frame member 18 is provided with mounting bosses 130, 132 adjacent the first end 28 and the second end 30 of the horizontal frame member 18. The mounting bosses 130, 132 include either an inwardly or outwardly facing hook 131, 133 shaped and dimensioned to engage the bottom of the storage receptacle 44. In accordance with a preferred embodiment, the mounting boss 130 adjacent the first end 28 of the horizontal frame member 18 is statically mounted while the mounting boss 132 adjacent the second end 30 of the horizontal frame member 18 is resiliented biased for sliding movement relative to the horizontal frame member 18. In this way, the mounting boss 132 may move toward the first end 28 when it is desired to position the first storage receptacle 44 on the horizontal frame member 18 and move away from the first end 28 when it is desired to secure the first storage receptacle 44 on the horizontal frame member 18.

The shopping cart 10 is further provided with a second storage receptacle 46 shaped and dimensioned for selective attachment to the vertical frame member 16. In particular, the vertical frame member 16 is provided with first and second upper latch assemblies 108, 110. Each of the first and second latch assemblies 108, 110 are composed of a static upward facing hook member 112, 114 adjacent the second end 24 of the vertical frame member 16. The second storage receptacle 46 includes a recess 58, which formed part of the receptacle handle 98 for the second storage receptacle 46, shaped and dimensioned to receive the first and second upward facing hook members 112, 114 in a manner supporting the second storage receptacle 46 from vertical frame member 16. That is, the upward facing hook members 112, 114 fit within the recess 58 such that the receptacle handle 98 of the second storage receptacle 46 sits within the concave surface defined by the upward facing hook members 112, 114. Although the weight of the second storage receptacle 46 will maintain the second storage receptacle 46 within the upward facing hook members 112, 114, secure attachment is facilitated by providing each of the first and second upper latch assemblies 108, 110 with a pivoting latch member 116, 118 that effectively closes the supporting recess defined by the upward facing hook members 112, 114 by moving between an extended position in which the pivoting latch members 116, 118 cover the top of the supporting recess to enclose the receptacle handle 98 of the second storage receptacle 46 therein. When it is desired to remove the second storage receptacle 46, the pivoting latch members are 116, 118 are pressed inward opening the top of the supporting recess so it can be removed from the support assembly 12.

In its use orientation, the support assembly 12 is opened with the vertical frame member 16 obliquely oriented relative to the horizontal frame member 18. Similarly, the first and second front wheels 36, 38 are laterally oriented relative to the second end 30 of the horizontal frame member 18 and the first and second rear wheels 40, 42 laterally and longitudinally extend beyond the horizontal frame member 18. The first and second storage receptacles 44, 46 may be selectively secured to the support assembly 12 when in this orientation.

After the user has finished shopping, he or she may roll the shopping cart 10 to their car and simply remove the storage receptacles 44, 46 from the support assembly 12. The storage receptacles 44, 46 may then be placed in the trunk or rear space of the automobile. With the storage receptacles 44, 46 removed, the user may then proceed to fold the support assembly 12 to its storage orientation. Once in its storage orientation, the support assembly 12 may also be placed within the trunk or rear space of the automobile. Movement of the shopping cart 10 between its use orientation and its storage orientation may be repeated by the user as often as he or she desires.

Figure 10A:
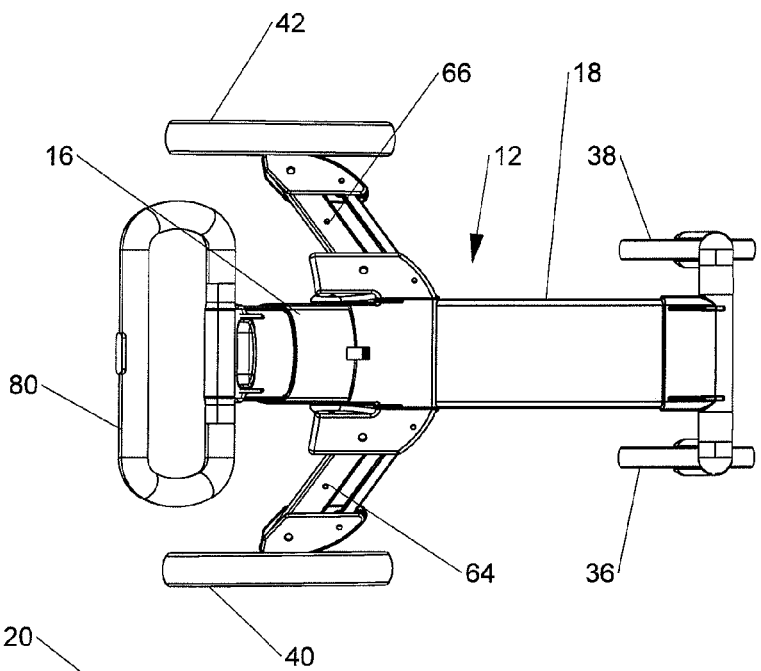
FIGS. 10A, 10B, 11A, 11B, 12A, 12B, 13A, 13B, 14A and 14B are top views and side views showing the support frame of the collapsible shopping cart in various stages of the collapse.
Figure 10B:
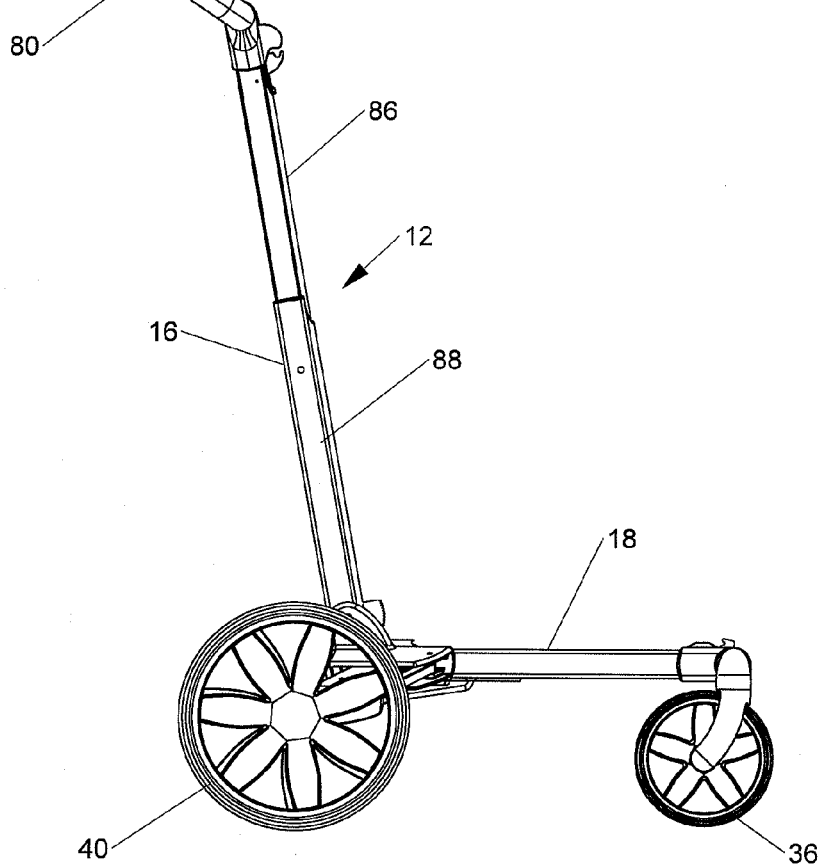

In particular, and with reference to FIGS. 10A, 10B, 11A, 11B, 12A, 12B, 13A, 13B, 14A and 14B, the process for folding the support assembly 12 is disclosed. Referring to FIGS. 10A and 10B, the shopping cart 10 is shown with the storage receptacles 44, 46 removed. In this use orientation, and with the horizontal frame member 18 supported on a flat supporting surface, the vertical frame member 16 extends upwardly with a slight incline.

The first step in collapsing the support assembly 12 is to tilt the handle 80 to its storage orientation. This is achieved by pressing upon a lock release 120 integrated with the handle 80 for permitting selective rotation of the handle 80 relative to the second end 24 of the vertical frame member 16. It is appreciated, this locking mechanism is a conventional design, for example, a cable release mechanism, although various locking mechanisms known to those skilled in the art could be employed within the spirit of the invention. See FIGS. 11A and 11B. Thereafter, and after it is confirmed the baskets have been removed, the lock pin 82 between the upper and lower vertical frame components 86, 88 is pressed allowing the upper vertical frame component 86 to telescopically move into the lower vertical frame component 88. Movement of the upper vertical frame component 86 to its storage position within the lower vertical frame component 88 causes release of a tilt lock pin 84 between the first end 22 of the vertical frame member 16 and the first end 28 of the horizontal frame member 18 permitting pivoting of the vertical frame member 16 relative to the horizontal frame member 18 as shown with reference to FIGS. 11A&B and 12A&B. In accordance with a preferred embodiment, and with reference to FIG. 12C, the tilt lock pin 84 rides in a groove that has a detent 122 in the end where a spring 124 pulls the tilt lock pin 84 into location and prevents tilt. When the upper vertical frame component 86 is completely lowered, the tilt lock pin 84 is pushed out of the detent 122 and will allow the vertical frame member 16 to pivot relative to the horizontal frame member 18 and fold forward.

Figure 12A:
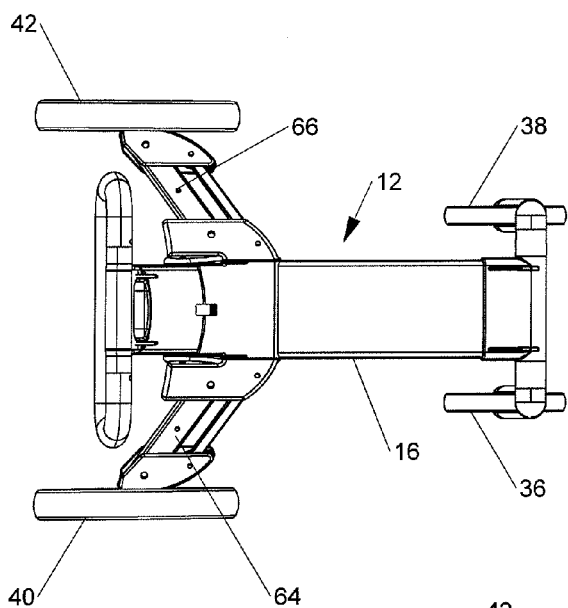
Figure 12C:
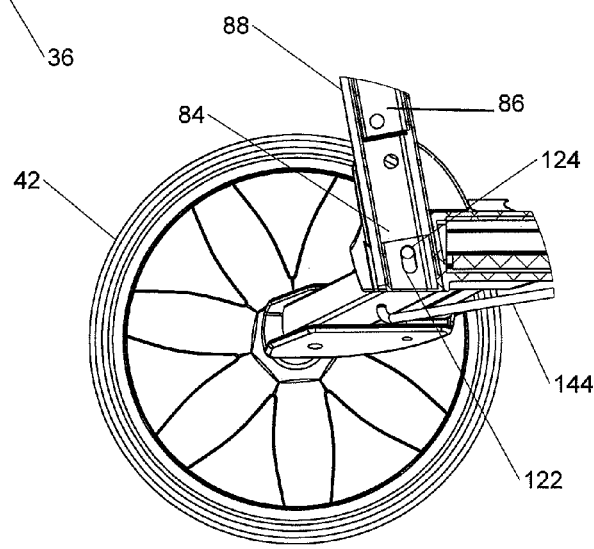
FIG. 12C is a detailed side view of the tilt lock pin assembly at the step associated with FIGS. 12A and 12B.

Referring to FIGS. 12A&B and 13A&B, as the vertical frame member 16 is folded relative to the horizontal frame member 18 the rear wheels 40, 42 are drawn toward the second end 30 of the horizontal frame member 18 and the body of the horizontal frame member 18. This movement is achieved under the control of the control lever 76 that is connected to the first and second rear support arms 64, 66 and the first and second rear wheels 40, 42 by a linkage assembly 78. In addition, to folding the first and second rear wheels 40, 42 to a storage orientation, the first and second front wheels 36, 38 are provided with a pivot allowing the first and second front wheels 36, 38 to rotate about an axis perpendicular to the longitudinal axis of the horizontal frame member 18 to further reduce the volumetric foot print of the support assembly 12. See FIGS. 14A and 14B.

Figure 14A:
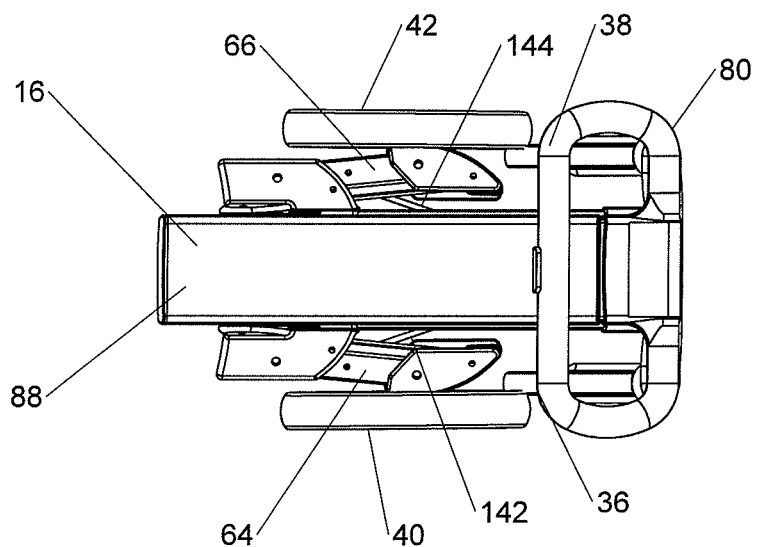
Figure 14B:
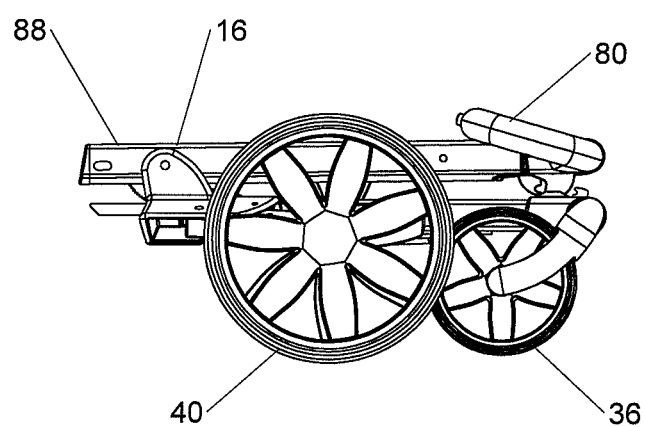

Once in the storage orientation shown in FIGS. 14A and 14B, the support assembly 12 is ready for placement within the trunk of an automobile or some other storage place.

Using the present collapsible shopping cart 10, the shopper can simplify the complicated shopping process outlined in the Background section. In particular, the shopper removed the present shopping cart 10 from the automobile and assembles the shopping cart 10 with the storage receptacles 44, 46. The shopper then chooses and scans item(s) using store scanner or smart phone with scanning applications (some produce requires weighing and coding.) and places the item(s) in the storage receptacles 44, 46 of the present shopping cart 10 where the item(s) may remain unhandled until the shopper is home. The shopper may also retrieve a shopping list using the scanner and then pay. The shopper then takes the present shopping cart 10 out to his/her automobile. The shopper then disengages the storage receptacles 44, 46 and places them in the automobile. The shopper then folds the present support assembly 12 and places it in the automobile. Once home, the shopper reassembles the shopping cart 10 with the storage receptacles 44, 46 and pushes them into the house, condo, office or apartment building. The shopper may then places the item(s) in storage (within or removed from the storage receptacles) and uses the shopping cart 10 as extra storage or returns it to automobile.

It should be appreciated the present shopping cart is very well suited for urban dwellers who would be using the cart on mass transit, or in some cases, directly pushing the cart back to their dwelling.

The present shopping cart 10 eliminates several unnecessary steps in the shopping process, solves the problems and inconveniences mentioned above, reduces plastic and paper bag waste, and promotes environmental sustainability.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A collapsible shopping cart, comprising:
a collapsible support assembly including a support frame having a vertical frame member and a horizontal frame member, the vertical frame member being pivotally secured to the horizontal frame member allowing the support frame to be selectively folded;
the vertical frame member is an elongated member having a first end and a second end, the vertical frame member being compose of telescoping upper and lower frame components and wherein the second end of the vertical frame member is provided with a handle pivotally secured to the vertical frame member at the second end of the vertical frame member;
the horizontal frame member is an elongated member having a first end and a second end, as well as an upper surface and a lower surface, the first end of the vertical frame member being pivotally connected to the first end of the horizontal frame member;
a plurality of wheels coupled to the horizontal support member, the plurality of wheels are coupled to the horizontal support member for movement between a use orientation and a storage orientation, wherein when the plurality of wheels are in the use orientation they extend from the horizontal support manner in a manner permitting engagement with a horizontal support surface such that the support assembly may roll thereupon;
a first storage receptacle shaped and dimensioned for selective attachment to the support assembly;
a second storage receptacle shaped and dimensioned for selective attachment to the support assembly; and
wherein the vertical frame member includes a first upper latch assembly composed of a static upward facing hook member adjacent the second end of the vertical frame member, and wherein the second storage receptacle includes a recess shaped and dimensioned to receive the upward facing hook member in a manner supporting the second storage receptacle from the vertical frame member, and the first upper latch assembly further includes a pivoting latch member that effectively closes the supporting recess defined by the upward facing hook member.

2. The shopping cart according to claim 1, wherein the first end of the vertical frame member is provided with a projection shaped and dimensioned to fit within a recess formed in the first end of the horizontal frame member, and a pivot pin couples the projection within the recess such that the vertical frame member and the horizontal frame member may pivot relative to each other.

3. The shopping cart according to claim 2, further including a tilt lock pin secured between the vertical frame member and the horizontal frame member.

4. The shopping cart according to claim 1, wherein the plurality of wheels comprises a first and second front wheels and first and second rear wheels.

5. The shopping cart according to claim 4, wherein the first and second front wheels are pivotally coupled to the second end of the horizontal frame member on opposite sides thereof.

6. The shopping cart according to claim 4, wherein the first and second rear wheels are respectively supported by first and second rear support arms which extend from opposite sides of the horizontal frame member at the first end of the horizontal frame member.

7. The shopping cart according to claim 6, wherein the first and second rear wheels are supported in a position beyond both the lateral and longitudinal extent of the horizontal frame member when in the use orientation.

8. The shopping cart according to claim 7, wherein each of the first end second rear support arms includes a first end pivotally secured to the horizontal frame member and a second end to which the respective first and second rear wheels are secured.

9. The shopping cart according to claim 8, further including a control lever connected to both the first and second rear support arms by a linkage assembly.

10. The shopping cart according to claim 1, wherein the second end of the vertical frame member is provided with a handle pivotally secured to the vertical frame member at the second end of the vertical frame member.

11. The shopping cart according to claim 1, wherein movement of the upper vertical frame component and the lower vertical frame component is controlled by a spring biased, moveable locking pin extending between the upper vertical frame component and the lower vertical frame component.

12. The shopping cart according to claim 1, wherein the horizontal frame member includes mounting bosses for selective attachment of the first storage receptacle.

13. The shopping cart according to claim 12, wherein each of the mounting bosses includes a hooked shaped and dimensioned to engage the first storage receptacle.

14. The shopping cart according to claim 13, wherein the mounting bosses includes a statically mounted first mounting boss and a resiliently biased second mounting boss.

* * * * *

UNITED STATES PATENT AND TRADEMARK OFFICE
CERTIFICATE OF CORRECTION

PATENT NO. : 8,567,809 B2
APPLICATION NO. : 13/446482
DATED : October 29, 2013
INVENTOR(S) : Allison White et al.

It is certified that error appears in the above-identified patent and that said Letters Patent is hereby corrected as shown below:

In the Claims

Column 9, line 48 through Column 10, line 21, cancel the text beginning with "1. A collapsible shopping" to and ending "facing hook member", and insert the following claim:

--1. A collapsible shopping cart, comprising:
    a collapsible support assembly including a support frame having a vertical frame member and a horizontal frame member, the vertical frame member being pivotally secured to the horizontal frame member allowing the support frame to be selectively folded;
    the vertical frame member is an elongated member having a first end and a second end, the vertical frame member being compose of telescoping upper and lower frame components and wherein the second end of the vertical frame member is provided with a handle pivotally secured to the vertical frame member at the second end of the vertical frame member;
    the horizontal frame member is an elongated member having a first end and a second end, as well as an upper surface and a lower surface, the first end of the vertical frame member being pivotally connected to the first end of the horizontal frame member;
    a plurality of wheels coupled to the horizontal support member, the plurality of wheels are coupled to the horizontal support member for movement between a use orientation and a storage orientation, wherein when the plurality of wheels are in the use orientation they extend from the horizontal support member in a manner permitting engagement with a horizontal support surface such that the support assembly may roll thereupon;
    a first storage receptacle shaped and dimensioned for selective attachment to the support assembly;
    a second storage receptacle shaped and dimensioned for selective attachment to the support assembly; and
    wherein the vertical frame member includes a first upper latch assembly composed of a static upward facing hook member adjacent the second end of the vertical frame member, and wherein the second storage receptacle includes a recess shaped and dimensioned to receive the upward facing hook member in a manner supporting the second storage receptacle from the vertical frame member, and the Signed and Sealed this
Thirty-first Day of December, 2013

Margaret A. Focarino
*Commissioner for Patents of the United States Patent and Trademark Office* first upper latch assembly further includes a pivoting latch member that effectively closes the supporting recess defined by the upward facing hook member.--

Column 11, line 1, cancel the text beginning with "13. The shopping cart" to and ending "first storage receptacle", and insert the following claim:

--13. The shopping cart according to claim 12, wherein each of the mounting bosses includes a hook shaped and dimensioned to engage the first storage receptacle.--